(12) United States Patent
Martin et al.

(10) Patent No.: US 7,129,831 B2
(45) Date of Patent: Oct. 31, 2006

(54) SYSTEM DIAGNOSTIC MODE FOR A SECURITY CENTRAL STATION RECEIVER

(75) Inventors: Christopher D. Martin, Plainview, NY (US); Robert J. Orlando, Nesconset, NY (US)

(73) Assignee: Honeywell International, Inc., Morristown, NJ (US)

( * ) Notice: Subject to any disclaimer, the term of this patent is extended or adjusted under 35 U.S.C. 154(b) by 193 days.

(21) Appl. No.: 10/971,191

(22) Filed: Oct. 22, 2004

(65) Prior Publication Data

US 2006/0098789 A1    May 11, 2006

(51) Int. Cl.
*G08B 29/00* (2006.01)
(52) U.S. Cl. ............ 340/506; 340/531; 379/1.01; 379/40
(58) Field of Classification Search ........... 340/506, 340/531; 370/352, 353; 455/423, 446, 445; 379/1.01, 40, 21, 1.03, 12, 26.01, 156, 22.07, 379/67.1, 372, 249, 142.01, 217.01
See application file for complete search history.

(56) References Cited

U.S. PATENT DOCUMENTS

| 4,481,574 A | * | 11/1984 | DeFino et al. | ........... 379/93.01 |
| 4,860,332 A | * | 8/1989 | Chism | ........... 379/1.01 |
| 5,005,197 A | | 4/1991 | Parsons et al. | |
| 6,301,345 B1 | * | 10/2001 | Suzuki | ........... 379/156 |
| 6,744,867 B1 | * | 6/2004 | Chin et al. | ........... 379/142.01 |

FOREIGN PATENT DOCUMENTS

DE    101 12 809 A1    9/2002
GB    2 242 100 A    9/1991

OTHER PUBLICATIONS

Silent Knight, "Central Station Receiver, Model 9800", Installation Manual, Online!, Jan. 2003, XP002364027.
GE Interlogix, "The Future of Central Station Monitoring with the Heritage of Osborne-Hoffman", OH 200E Central Monitoring Receiver, Online!, 2002, XP002364032.

* cited by examiner

*Primary Examiner*—Anh V. La
(74) *Attorney, Agent, or Firm*—Scully, Scott, Murphy & Presser, P.C.

(57) ABSTRACT

A system diagnostic mode is provided for a security central station receiver that monitors the operations of a large number of individual security systems over a large number of telephone lines. The system diagnostic mode provides the receiver with the capability to test itself for proper operation after it has been initially installed, or on a repeated basis thereafter, to ensure that the receiver at the security central station is fully operational. A plurality of line cards are designed to serve and interface with the large number of telephone lines. The auto test diagnostic mode tests the operation of the central station receiver, and is programmed to automatically dial into each of the plurality of line cards and to send to each line card a number of preformatted test signals using standard reporting formats that are generated by the auto test diagnostic mode. The auto test diagnostic mode is preferably provided on a test line card that generates the preformatted test signals. After the test is completed, the auto test diagnostic mode routes a report on the results of the preformatted tests to an output of the security central station receiver such as an automation system.

20 Claims, 2 Drawing Sheets

US 7,129,831 B2

SYSTEM DIAGNOSTIC MODE FOR A SECURITY CENTRAL STATION RECEIVER

BACKGROUND OF THE INVENTION

1. Field of Invention

The present invention relates generally to a system diagnostic mode for a security central station receiver, and more particularly pertains to a system diagnostic mode and method for a security central station receiver that provides the receiver with the capability to test itself for proper operation after it has been initially installed, and on a repeated basis thereafter, to ensure that the receiver at the security central station is fully operational.

2. Discussion of the Prior Art

In the present state of the art of security systems, a security central station receiver typically monitors the operations of a large number of individual security systems over a large number of telephone lines. The security central station receiver interfaces to many different types of security systems/control panels by outputting different types of handshake signals to the different types of security systems/control panels. When a security system/control panel receives the proper handshake signal, it downloads its data to the security central station receiver, after which the central security station transmits a kiss-off signal to the security system/control panel, and issues a report on the download of data to an automation system that acts upon the download of data.

In the present state of the art, security central station operators do not have the capability to test a security central station receiver for proper operation after it has been initially installed, or on a repeated basis thereafter, to ensure that the receiver at the security central station is fully operational.

SUMMARY OF INVENTION

The present invention provides a system diagnostic mode and method for a security central station receiver that has the capability to test the receiver for proper operation after it has been initially installed, and on a repeated basis thereafter, to ensure that the receiver at the security central station is fully operational.

The present invention provides operators of security central stations with an automatic method for testing the reliability of a security central station receiver, each telephone line connected to the receiver, each line card in the receiver, and to ensure that the receiver is capable of properly accepting a number of industry standard reporting formats. The test method also tests the output of the security central station receiver, such as to the automation system.

The present invention provides a security central station receiver that is designed to monitor the operations of a large number of individual security systems over a large number of telephone lines. A plurality of line cards are designed to serve and interface with the large number of telephone lines. An auto test diagnostic mode and method tests the operation of the central station receiver, and is programmed to automatically dial into each of the plurality of line cards and to send to each line card a number of preformatted test signals using standard reporting formats that are generated by the auto test diagnostic mode. The auto test diagnostic mode is preferably provided on a test line card that generates the preformatted test signals using standard reporting formats. After the test is completed, the auto test diagnostic mode routes a report on the results of the preformatted tests to an output of the security central station receiver such as an automation system.

BRIEF DESCRIPTION OF THE DRAWINGS

The foregoing objects and advantages of the present invention for a system diagnostic mode for a security central station receiver may be more readily understood by one skilled in the art with reference to the following detailed description of several embodiments thereof, taken in conjunction with the accompanying drawings wherein like elements are designated by identical reference numerals throughout the several views, and in which.

DETAILED DESCRIPTION OF THE INVENTION

Figure 1:
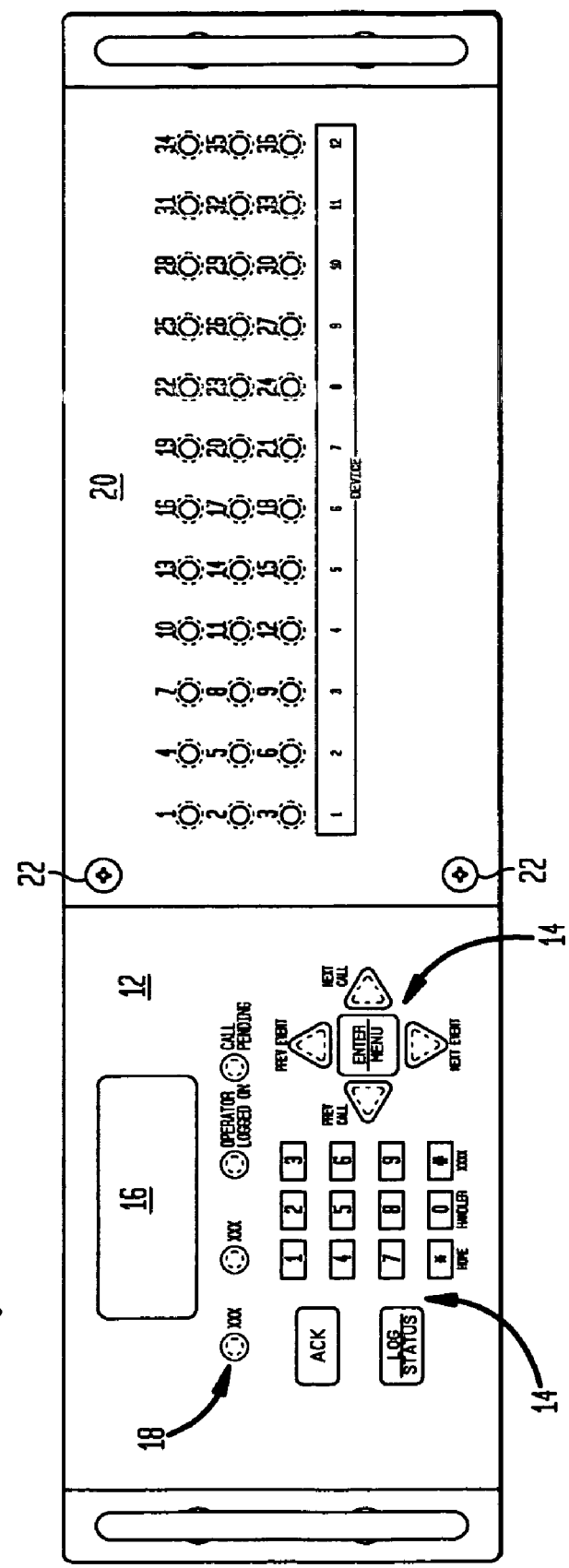
FIG. 1 illustrates a front view of a security central station receiver that is designed to monitor the operations of a large number of individual security systems over a large number of telephone lines.

FIG. 1 illustrates a front view of a security central station receiver 10 that is designed to monitor the operations of a large number of individual security systems over a large number of telephone lines. The security digital central station receiver 10 monitors a large number of individual security systems, typically installed at residential and commercial premises, and receives alarm or other security signals from each individual security system when an alarm or security event is detected by the security system, The security central station receiver 10 interfaces to many different types of security systems/control panels by outputting different types of handshake signals to the different types of security systems/control panels. When a security system/control panel receives the proper handshake signal from the security central station receiver, it downloads its data to the security central station receiver 10, after which the central security station transmits a kiss-off signal to the security system/control panel, and issues a report on the download of data to an automation system that acts upon the download of data.

The front control panel 12 of the receiver 10 includes a keypad 14 for manual operation and programming of the receiver, a display 16, and LEDs 18 indicating system operation and programming.

Figure 2:
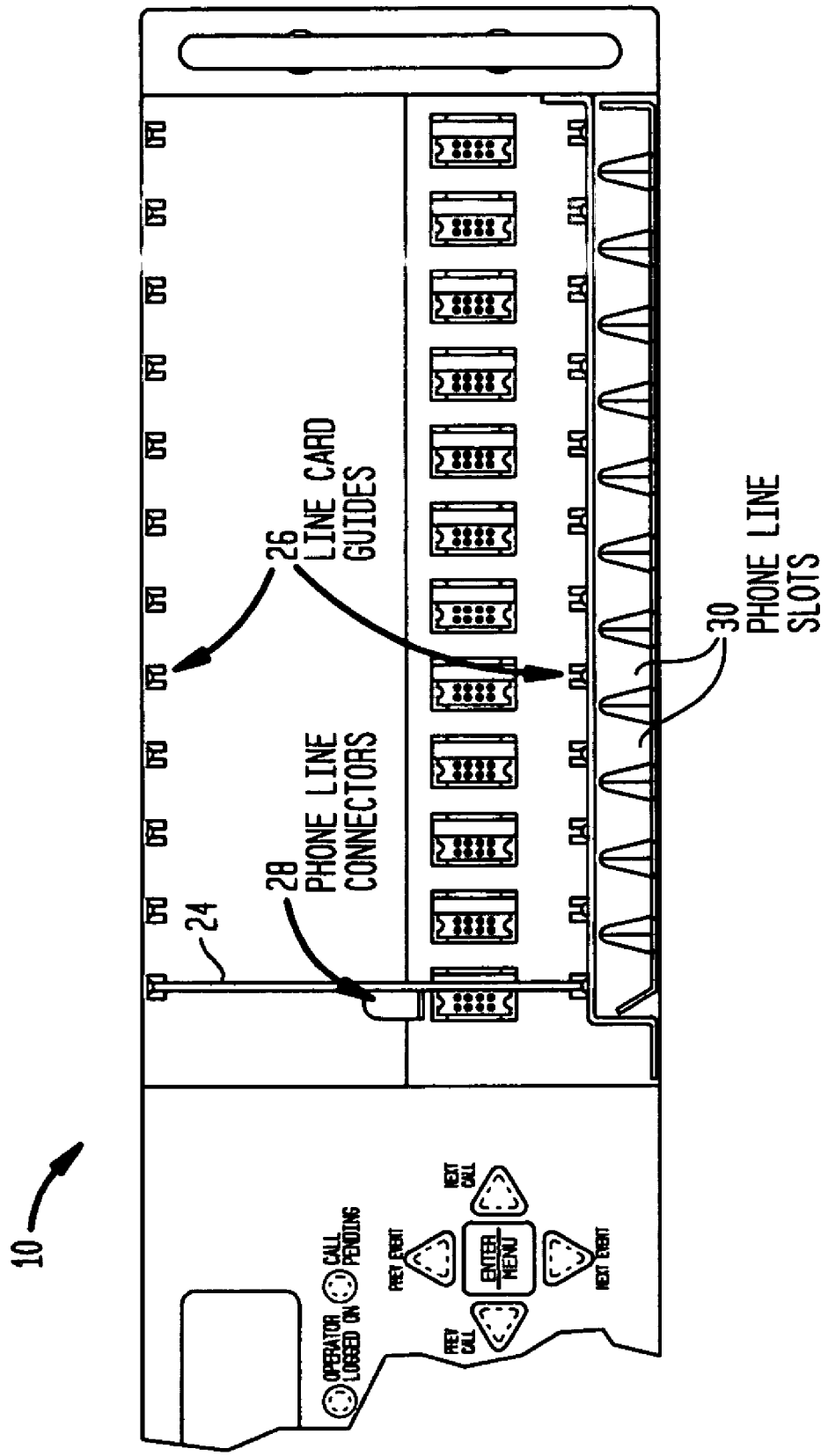
FIG. 2 illustrates the receiver of FIG. 1 with a portion of the front panel removed, and illustrates one line card mounted in one of twelve mounting slots provided by line card guides, with an attached telephone line connector.

The front control panel also includes a removable panel 20, removable by front plate screws 22, to provide for easy access to a plurality (e.g. twelve) of line cards 24 mounted in a plurality of mounting slots provided for the cards. FIG. 2 illustrates the receiver with the front panel 20 removed, and illustrates one line card 24 mounted in one of twelve mounting slots provided by line card guides 26, with an attached telephone line connector 28 from a telephone line routed in a telephone line slot 30.

The disclosed embodiment is designed to operate with several different types of line cards. A single line card is designed to serve and interface with a single telephone line, or a tri-line card is designed to serve and interface with three different telephone lines, or a line card is designed to serve and interface with a long range radio transceiver.

Pursuant to the present invention, at least one of the line cards is a test line card that is designed to be programmed to provide an auto test diagnostic mode, in which it automatically dials into each of the other line cards in the receiver and sends to the other line card a number of preformatted test signals using standard reporting formats that are generated by the test line card. The reports on the results of the preformatted tests are then routed to the automation system like any other report the security central station receiver receives.

The present invention provides the security central station receiver with an auto test diagnostic mode that allows an operator/installer at the security central station to program a number of parameters so that the security central station can automatically test itself. When scheduled by programming, the test line card (designated by the operator/installer of the security central station receiver) automatically dials into each of the other line cards in the receiver. The test line card then sends to each of the other line cards in the receiver a number of preformatted test signals using standard reporting formats such as Contact ID, SIA, BFSK, etc., that are generated by the test line card. The reports on the results of the preformatted tests are then routed to the automation system like any other report the security central station receiver receives, along with an ID signal that identifies the reports on the results of the preformatted tests as such.

The installer of the security central station receiver programs a special test account number into the security central station receiver for this purpose so that the test signals may be correctly identified as such by the automation system operator. The auto test diagnostic mode is capable of automatically testing all of the following aspects of the security central station receiver, the telephone lines, the line card operation, and the output of the security central station receiver to an output such as the automation system, a printer, etc.

The security central station receiver includes some additional programming fields to facilitate the auto test diagnostic mode. The auto test diagnostic mode has the following capabilities:

the ability to program up to 36 telephone numbers, the ability to program a number of schedules to perform the tests, such as daily, weekly, monthly, etc., the ability to program which test formats are sent to each line card when the test is conducted (3/1, 4/1 pulse, Contact ID, high speed, 4/2 Express, BFSK, SIA, Modem II, etc.), the ability to program a test account number to be sent with each test so that the reports on the test results are recognized as such by the automation system.

The at least one test line card is designed with the capability of generating alarm like reports using industry standard formats such as 4/1 pulse 10, 20, or 40 pps, ADEMCO high speed, 4+2 Express, Contact ID, BFSK, Modem II, SIA, FSK, etc.

In alternative embodiments, a security central station receiver can service any number of telephone lines, such as 136 or more telephone lines. Alternatively, a central security station might have multiple security central station receivers, with a single line card in one receiver designated as the test line card, which can then dial all of the other receiver line cards in all of the receivers, including itself.

When the test is being conducted, the test line card dials each telephone line connected to the security central station receiver, one telephone line at a time, and sends each of the tests selected by the installer for that telephone line over the dialed telephone line connection. The test continues, one telephone line at a time, until all of the telephone line numbers have been dialed and all programmed test formats have been sent for each telephone line connection. At the end of the test, a detailed report on the test results for each telephone line of all of the programmed telephone lines is generated to the automation system or printer as desired, or the detailed report may be stored in the receiver memory for later review.

While several embodiments and variations of the present invention for a system diagnostic mode for security central station receiver are described in detail herein, it should be apparent that the disclosure and teachings of the present invention will suggest many alternative designs to those skilled in the art.

We claim:

1. A security central station receiver that is designed to monitor the operations of a large number of individual security systems over a large number of telephone lines, comprising:

a plurality of line cards designed to serve and interface with the large number of telephone lines that provide telephone connections to the large number of individual security systems; and an auto test diagnostic mode that tests the operation of the central station receiver, and is programmed to automatically dial into each of the plurality of line cards and to send to each line card a number of preformatted test signals using standard reporting formats that are generated by the auto test diagnostic mode.

2. The security central station receiver of claim 1, wherein after the test is completed, the auto test diagnostic mode routes a report on the results of the preformatted tests to an output of the security central station receiver.

3. The security central station receiver of claim 1, wherein the auto test diagnostic mode is provided on a test line card that generates the preformatted test signals using standard reporting formats.

4. The security central station receiver of claim 1, wherein the auto test diagnostic mode routes a report on the results of the preformatted tests to an output of the security central station receiver along with an identification signal that identifies the report on the results of the preformatted tests as such.

5. The security central station receiver of claim 4, wherein an installer of the security central station receiver programs the identification signal as a test account number into the security central station receiver so that the test signals are correctly identified as such.

6. The security central station receiver of claim 1, wherein the auto test diagnostic mode tests the telephone lines, the operation of each of the plurality of line cards, and the output of the security central station receiver.

7. The security central station receiver of claim 6, wherein the auto test diagnostic mode tests each telephone line connected to the receiver, each line card in the receiver, and tests to ensure that the security central station receiver properly accepts a number of industry standard reporting formats.

8. The security central station receiver of claim 1, wherein the auto test diagnostic mode provides the capability to program a plurality of telephone numbers, to program a schedule to perform tests, to program which test formats are sent to each line card when a test is conducted, and to program a test account number to be sent with each test so that the reports on the test results are recognized as such.

9. The security central station receiver of claim 1, wherein when the test is conducted, the auto test diagnostic mode dials each telephone line connected to the security central station receiver, one telephone line at a time, and sends each of the tests selected by an installer for that telephone line over the dialed telephone line connection, and the test continues, one telephone line at a time, until all of the telephone line numbers have been dialed and all programmed test formats have been sent for each telephone line connection.

10. The security central station receiver of claim 1, wherein the plurality of line cards includes a single line card for serving and interfacing with a single telephone line, a multi-line card for serving and interfacing with multiple different telephone lines, and a line card for serving and interfacing with a long range radio transceiver.

11. An auto test diagnostic method that tests the operation of a security central station receiver that is designed to monitor the operations of a large number of individual security systems over a large number of telephone lines, comprising:
providing the central station receiver with a plurality of line cards designed to serve and interface with the large number of telephone lines that provide telephone connections to the large number of individual security systems; and
providing an auto test diagnostic mode that tests the operation of the central station receiver, and is programmed to automatically dial into each of the plurality of line cards and to send to each line card a number of preformatted test signals using standard reporting formats that are generated by the auto test diagnostic mode.

12. The method of claim 11, wherein after the test is completed, the auto test diagnostic mode routes a report on the results of the preformatted tests to an output of the security central station receiver.

13. The method of claim 11, including providing the auto test diagnostic mode on a test line card that generates the preformatted test signals using standard reporting formats.

14. The method of claim 11, wherein the auto test diagnostic mode routes a report on the results of the preformatted tests to an output of the security central station receiver along with an identification signal that identifies the report on the results of the preformatted tests as such.

15. The method of claim 14, wherein an installer of the security central station receiver programs the identification signal as a test account number into the security central station receiver so that the test signals are correctly identified as such.

16. The method of claim 11, wherein the auto test diagnostic mode tests the telephone lines, the operation of each of the plurality of line cards, and the output of the security central station receiver.

17. The method of claim 16, wherein the auto test diagnostic mode tests each telephone line connected to the receiver, each line card in the receiver, and tests to ensure that the security central station receiver properly accepts a number of industry standard reporting formats.

18. The method of claim 11, wherein the auto test diagnostic mode provides the capability to program a plurality of telephone numbers, to program a schedule to perform tests, to program which test formats are sent to each line card when a test is conducted, and to program a test account number to be sent with each test so that the reports on the test results are recognized as such.

19. The method of claim 11, wherein when the test is conducted, the auto test diagnostic mode dials each telephone line connected to the security central station receiver, one telephone line at a time, and sends each of the tests selected by an installer for that telephone line over the dialed telephone line connection, and the test continues, one telephone line at a time, until all of the telephone line numbers have been dialed and all programmed test formats have been sent for each telephone line connection.

20. The method of claim 11, including providing the plurality of line cards with a single line card for serving and interfacing with a single telephone line, a multi-line card for serving and interfacing with multiple different telephone lines, and a line card for serving and interfacing with a long range radio transceiver.

* * * * *